March 3, 1970
A. ERNST
3,498,574
FLUTTERING WING AERIAL PROPELLED APPARATUS SUITABLE FOR CARRYING A MAN
Filed June 29, 1967
3 Sheets-Sheet 1
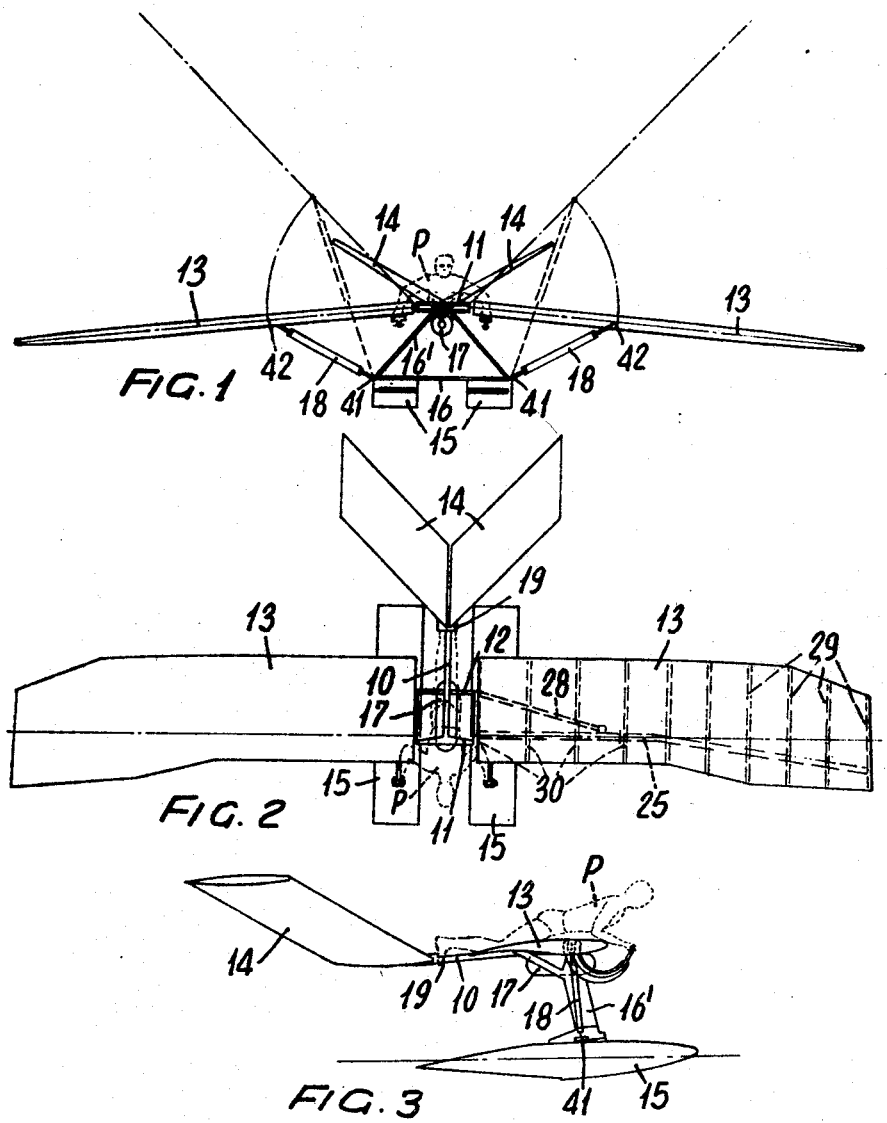
INVENTOR
ALFRED ERNST
BY Bailey, Stephens + Huettig
ATTORNEYS

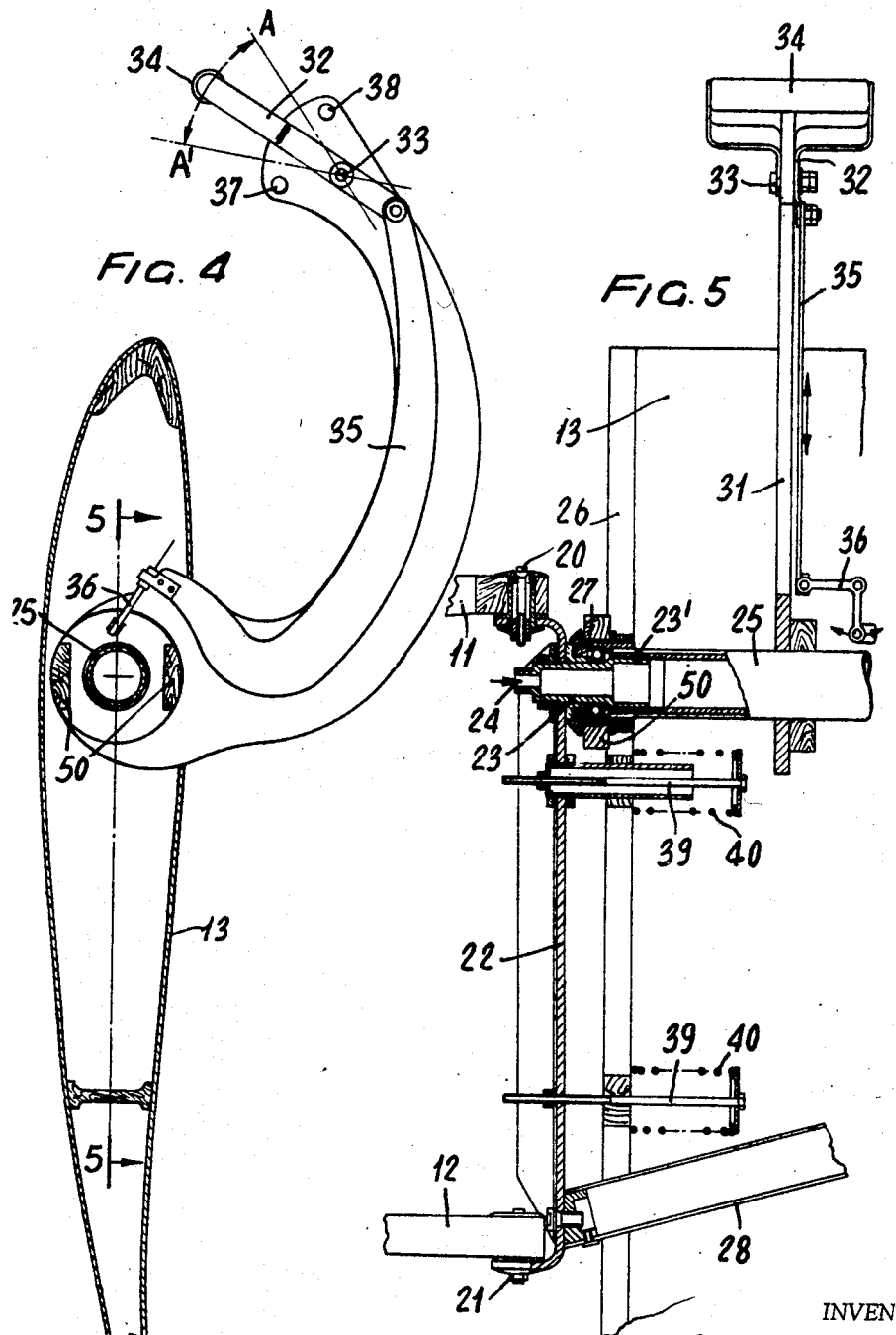

March 3, 1970  A. ERNST  3,498,574
FLUTTERING WING AERIAL PROPELLED APPARATUS SUITABLE
FOR CARRYING A MAN
Filed June 29, 1967  3 Sheets-Sheet 3

INVENTOR.
ALFRED ERNST

United States Patent Office 3,498,574
Patented Mar. 3, 1970

3,498,574
FLUTTERING WING AERIAL PROPELLED APPARATUS SUITABLE FOR CARRYING A MAN
Alfred Ernst, Via del Cairo 37, Varese, Italy
Filed June 29, 1967, Ser. No. 649,961
Claims priority, application Italy, Aug. 5, 1966, 21,154/66
Int. Cl. B64c 33/02
U.S. Cl. 244—22                                           1 Claim

ABSTRACT OF THE DISCLOSURE

A fluttering wing aerial propelled apparatus characterized by comprising such control means that lift, flutter and partial twisting or warping of the wings are at any instant determined by the operator, as well as a driving apparatus for providing the majority or the whole of the power required for wing movements.

---

This invention relates to a fluttering wing aerial propelled apparatus similar to bird propelling system and suitable for carrying a man.

However, the aim of the invention is not to solve the problem of human flight, but rather to provide a sporting and physical training means. It is the basic feature of the apparatus according to the invention to comprise such control means that lift, flutter and partial twisting or warping of the wings are at any moment determined by the operator, as well as a driving apparatus for providing the majority or the whole of the power required for wing movement. As a result of warping, the wings will take a spiral configuration, thus providing the variation of incidence, either positive or negative. Concurrence of positive incidence with wing lift and negative incidence with wing flutter will provide a propulsion causing the apparatus to move and, in case, to fly with its operator.

According to a preferred embodiment, as described hereinatfer, the apparatus is contemplated for utilization on water. However, this invention contemplates also further embodiments, according to which the apparatus can be caused to take-off or to land on ground or snow.

As to the driving apparatus, the same is also described hereinafter according to an unrestrictive preferred embodiment thereof. Other power sources, in fact, may be provided, such as presurized fluid as generated by combustion.

Figure 6:
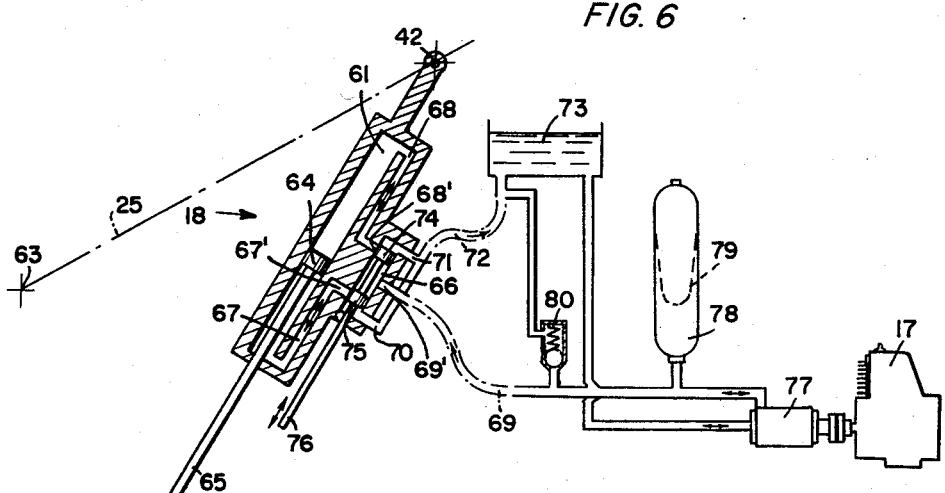
Figure 7:
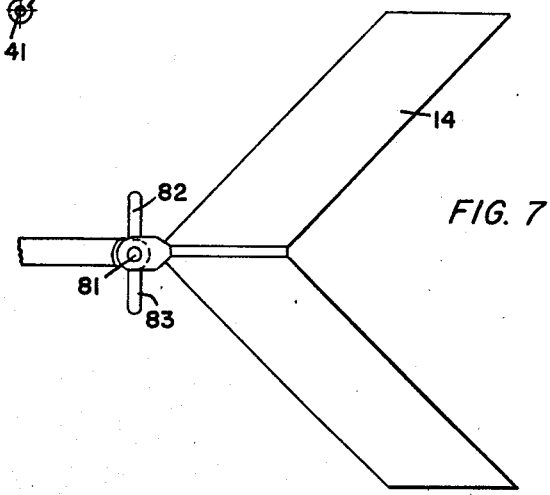

The apparatus according to the present invention is shown by way of unrestrictive example in accordance with a preferred embodiment thereof in the accompanying drawings, in which:

FIGURE 1 is a front view of the apparatus;
FIGURE 2 is a plan view of the apparatus;
FIGURE 3 is a side view of the apparatus;
FIGURE 4 is an enlarged partial sectional view of the wing at the level of control bar attachment;
FIGURE 5 is a partial section of FIGURE 4 according to the plane through 5—5;
FIGURE 6 is a diagrammatic view, partly in cross-section, of the oleodyanamic copying system control; and
FIGURE 7 is a plan view of the tail plane portion of the apparatus.

Particularly referring to FIGS. 1, 2 and 3, the apparatus consists of the following main members: a central frame formed of an axial spar 10 and two forward and median cross pieces 11 and 12, respectively; wings 13 and tail inclined planes 14; floats 15 and triangle frame 16 connecting said floats 15 to the central frame; a driving apparatus comprising: an internal combustion engine 17 connected to a pump and hydro-pneumatic accumulator; a plurality of pipes connecting the accumulator with two oleodynamic cylinder-piston units 18 and provided with valves manually controlled by two levers fulcrummed on arms fast with wing spars. For sake of simplicity, only engine 17 and cylinder-piston units 18 for driving apparatus have been shown in the drawing, said cylinder-piston units 18 being interposed between frame 16 and wings 13. More particularly, at the bottom each cylinder-piston unit 18 is pivoted at 41 at a base angle of frame 16 and at the top at the corresponding wing at 42.

It is to be noted that wing displacements are proportional to displacements effected by control knobs to be disclosed hereinafter. Valve systems being used are of a known type (such as of the hydro-copying character as used for oleo-dynamic control of machine tools).

Particularly, said central frame will carry person P (shown in the drawings by dashed lines and in the following referred to as operator) and for this purpose there may be provided proper rear members 19 for foot restraint, breast rest members, etc.; such members are not shown as providable individually by concerned according to preferences thereof.

At the hear end, frame 10 carries tail plane 14, said planes being V-arranged and forming an obtuse angle; in the case, such planes may be controlled by operator's feet; on spar 10 there are also anchored the inclined rods 16' of triangle frame 16 carrying said floats 15.

At the side ends of cross pieces 11 and 12 (FIGS. 4 and 5) there are provided two pin joints 20 and 21, respectively. The latter will connect section 22 which, owing to said pins, is allowed to rotate. At the front portion of section 22, sleeve 23 is integrally mounted, said sleeve or bush outwardly communicating through hole 24 for the passage of oil ducts (not shown) and internally having a threaded area 23' of a greater diameter for a fixed connection with the axis 25 of wing 13. In FIGURE 2, right-hand wing shows by dash lines the direction of said axis, which is slightly shifted from the space between the fourth and fifth ribs. It will be apparent that this deviation provided for streamline conveniences in the pattern shown may be even omitted.

Bearing 27 is interposed between spar 50 formed of two soles or slabs and sleeve 23 to allow rotation for spar 50.

Tube 28, coplanar with axis 25, is secured to section 22 at the rear end thereof, said tube converging to and joining said axis beyond the first ribs. This tube 28 cooperates with the sleeve 23 and axis 25 to rigidly maintain the wing attachment and strengthen the adjacent area thereof.

End ribs 29 of the wing are fast with spar 50, whereas ribs 30 are idle thereto.

FIGS. 4 and 5 show arcuate arm 31 secured to spar 50 downwardly emerging from the wing and forwardly extending. At its outer end, said arm 31 carries a lever 32 fulcrummed at 33 and terminating with a handle 34; the latter is to be gripped by the operator and caused to alternatively rock in the direction of arrows A and A'. At the opposite end, said lever 32 is pivoted to an arm 35 of a curved configuration as arm 31. Said lever 35 transfers oscillations of lever 32 to a small bent lever 36 which, through tie rods not shown, will act on the valve for regulating oil flow from the ducts to the respective oleodynamic cylinder 18.

Angle of oscillation for handle 34 is restricted by stop members 37 upstream said lever and stop members 38 downstream the same.

Wing warping is possible because, as above stated, only the end portion thereof is fast with spar 50 through said ribs, the other being idle. Moreover, anchorage of first rib 26 to section 22 is carried out with some resiliency. In fact, since first rib 26 would tend to outwardly displace during the motion, there are provided one or more tie rods 39 having springs 40 for a resilient restraint of said rib 26 relative to said section 22.

As a whole, the entire wing is made with lightness and resiliency principles.

Wing warping is determined by rotation of the entire arm 31, causing spar 50 to rotate about axis 25 at sleeve 23.

By grasping with both hands the two handles 34, the operator can control both the wing flutter and lift, as above stated, and the positive and negative wing warping. It will be the operator's skill to coincide the most suitable streamline warping with each flutter and lift at a particular instant in order to provide the maximum propulsion. From the foregoing, it is to be noted that the controls for the two wings are independent from each other.

FIGURE 1 shows by a full line the lowered position corresponding to flutter for each wing, and by dashed line the raised position corresponding to lift for each wing.

In FIGURE 6, the oleodynamic copying system of this invention has a cylinder piston unit 18 composed of a double-acting cylinder 61 connected by a pivot 42 to a wing 13 which is represented by its axis 25. The axis 25 of the wing is rotatable about a pivot 63 which corresponds to the pivots 20 and 21 of FIGURE 5.

Piston 64 in cylinder 61 is joined to a piston rod 65 which, in turn, is connected to pivot 41 of frame 16 in FIGURE 1.

A valve body integral with cylinder 16 has five ports of which the inlet and outlet ports 67' and 68' communicate with the opposite ends of cylinder 61 by passageways 67 and 68. Inlet port 69' is connected by pipe 69 with the fluid pressure source. Outlet ports 70 and 71 are connected with a common pipe 72 leading to the tank 73 containing fluid which is not under pressure.

Inside valve body 66 are two pistons 74 and 75 joined to a common piston rod 76 which, in turn, is joined to the system composed of lever 36 and arm 35 to handle 34 mounted in wing 13 as shown in FIGURE 5. The distance between pistons 74 and 75 is equal to that of ports 67' and 68'. Consequently, when the rod 76 is moved longitudinally either in one direction or the other, the ports 67' and 68' are either opened or closed.

Pipe 69 for the pressure fluid is joined to the outlet of hydraulic pump 77 which is supplied from tank 73. Pump 77 is driven by motor 17.

Inasmuch as the cylinder piston unit moves with its relevant wing 13, pipes 69 and 72 must be made flexible, as shown by dashed lines. Pipe 69 is also connected with an under pressure fluid tank 78 in which is an expansible bag 79 containing air under pressure. This tank 78 with its bag 79 functions as a lung to maintain a constant pressure in the fluid which goes to valve body 66. In the case that the fluid pressure downstream of tank 78 should rise above a fixed value, the relief valve 80 opens for discharging the fluid into tank 73.

In operation, when handle 34 is moved to actuate arm 35 in lever 36, the rod 76 and pistons 74 and 75 are moved, for example, upwardly in FIGURE 6. The ports 67' and 68' are opened by a pipe 69 in communication with passageway 68 and at the same time passageway 67 is put in communication, through ports 67 and 70, with pipe 72 and tank 73. Consequently fluid pressure is placed in the upper portion of cylinder 61 and moves the cylinder itself upwardly relative to its piston 64. This compels the axis 25 of wing 13 to rotate around pivot 63. Also, during this movement, the cylinder 61 moves with it valve body 66. Consequently, if the rod 76 has been stopped by the operator from longitudinal movement, the valve body 66 will move longitudinally relative to its pistons 74 and 75. This relative movement is effective in a direction opposite to the previous one so that at a certain point pistons 74 and 75 again close ports 67' and 68'. The closing of these ports stops the fluid pressure flow and therefor the movement of the wing.

Now, if the operator moves the rod 76 downwardly, the fluid under pressure flows into the lower part of cylinder 61 while the fluid in the upper portion of the cylinder is discharged, thus causing the axis 25 of the wing to rotate downwardly.

Consequently, the angle of rotation of the wing on the axis 25 depends upon the degree of movement given by the operator to the rod 76 and correspondingly the frequency of king fluttering is directly controlled by the operator himself. It is especially noted that the wing movements follow exactly the controls given by the operator in the sense that the operator is allowed either to displace the wing in the desired direction and distance or to stop it at will in any wanted position. Thus, the wing exactly follows or copies the movements made by the operator. The wing working force is supplied by fluid under pressure while the operator only works the controls.

The movement of the tail planes 14 by the operator's feet is shown in FIGURE 7. The tail planes 14 are joined to a vertical pivot 81 and to foot pedals 82 and 83. Pushing the pedals one way or the other will move the tail planes 14 around a vertical axis. Alternatively the direction of movement of the apparatus could be controlled by merely moving one wing and keeping the other steady.

What is claimed is:

1. A fluttering wing propelled apparatus comprising a frame, a pair of fluttering wings each having a root end pivotally joined to said frame, a wing tip, and a plurality of skin-covered ribs, means for changing the incidence of said wings comprising for each wing spar means extending from said frame and secured to the tip end ribs for being turned to warp the wing tip end of the wing, means for preventing the root end rib from being rotated by said spar and for permitting the remaining ribs to rotate freely with respect to said spar, a motor supported on said frame, an oleodynamic circuit connected between said motor and said wings including a pump driven by said motor, and a pressure fluid accumulator and a hydrocopying system joined between said motor and said wings for lifting and fluttering said wings.

References Cited

UNITED STATES PATENTS

| 2,783,955 | 3/1957 | Fitzpatrick | 244—22 |
| 1,704,112 | 3/1929 | Stelzer | 244—22 |
| 1,989,755 | 2/1935 | Jelalian | 244—22 |

FOREIGN PATENTS

| 922,233 | 5/1963 | Great Britain. |

MILTON BUCHLER, Primary Examiner

J. E. PITTENGER, Assistant Examiner

U.S. Cl. X.R.

244—72, 123